US011085840B2

(12) United States Patent
Kim et al.

(10) Patent No.: US 11,085,840 B2
(45) Date of Patent: Aug. 10, 2021

(54) APPARATUS AND METHOD FOR MEASURING AXIAL FORCE OF BOLT

(71) Applicants: HYUNDAI MOTOR COMPANY, Seoul (KR); KIA MOTORS CORPORATION, Seoul (KR); Industry-University Cooperation Foundation Hanyang University, Seoul (KR)

(72) Inventors: Jong Seong Kim, Daejeon (KR); Jun Hong Park, Seongnam-si (KR); Yeon Uk Seong, Seoul (KR); Wan Seung Kim, Mokpo-si (KR); Gyung Min Toh, Seoul (KR)

(73) Assignees: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 78 days.

(21) Appl. No.: 16/592,601

(22) Filed: Oct. 3, 2019

(65) Prior Publication Data
US 2020/0355565 A1 Nov. 12, 2020

(30) Foreign Application Priority Data
May 10, 2019 (KR) .................. 10-2019-0055101

(51) Int. Cl.
*G01L 5/00* (2006.01)
*G01L 5/166* (2020.01)
(Continued)

(52) U.S. Cl.
CPC ............ *G01L 5/0019* (2013.01); *G01L 1/183* (2013.01); *G01L 5/166* (2013.01); *F16B 39/24* (2013.01)

(58) Field of Classification Search
CPC .......... F16B 31/021; F16B 39/24; G01L 5/24; G01L 5/246; G01L 5/0019; G01L 1/183; G01L 5/166; B21J 15/022
(Continued)

(56) References Cited

U.S. PATENT DOCUMENTS 3,362,112 A * 1/1968 Kirchner ............... B24B 33/04
451/465
3,975,948 A * 8/1976 Makino ................. G01L 5/246
73/581
(Continued)

FOREIGN PATENT DOCUMENTS

| JP | H06206127 | * | 7/1994 |
| JP | H08170933 | * | 7/1996 |
| KR | 10-1998-0003507 A | | 3/1998 |

*Primary Examiner* — Octavia Hollington
(74) *Attorney, Agent, or Firm* — Morgan, Lewis & Bockius LLP

(57) ABSTRACT

An axial force measurement apparatus measuring an axial force of a bolt member by measuring a clamping force, of a nut member threaded onto the bolt member, which is applied to fasten a structure, includes: a sensor that applies vibration to the structure through one side of the tightened nut member and obtains, on an opposite side of the nut member, a signal by the vibration that propagates through the structure and passes through the nut member; and an analyzer that analyzes the signal received from the sensor and determines the axial force of the bolt member using a difference in propagation velocity of the signal by the vibration according to the clamping force of the nut member.

16 Claims, 15 Drawing Sheets

(51) Int. Cl.
*G01L 1/18* (2006.01)
*F16B 39/24* (2006.01)

(58) Field of Classification Search
USPC .................................................. 73/862.381
See application file for complete search history.

(56) References Cited

U.S. PATENT DOCUMENTS 9,121,777 B2* 9/2015 Hsieh .................... F16B 31/025
2006/0225511 A1* 10/2006 Burmann ................ G01L 5/246
73/761

* cited by examiner

APPARATUS AND METHOD FOR MEASURING AXIAL FORCE OF BOLT

CROSS-REFERENCE TO RELATED APPLICATION

This application claims the benefit of priority to Korean Patent Application No. 10-2019-0055101, filed in the Korean Intellectual Property Office on May 10, 2019, the entire contents of which are incorporated herein by reference.

TECHNICAL FIELD

The present disclosure relates to an apparatus and method for measuring an axial force of a bolt member, and more particularly, relates to an apparatus and method for measuring an axial force of a bolt member by measuring a clamping force that the bolt member and a nut member threaded onto the bolt member apply to fasten a structure.

BACKGROUND

In general, a wheel and a disc are combined with each other to enable a tire of a vehicle to rotate together with the disc. The wheel and the disc are assembled by a plurality of wheel nuts in an assembly process of a vehicle body.

In a wheel assembly structure according to the related art, a wheel and a disc are combined with each other by allowing a plurality of bolts protruding from one side of the disc to pass through the wheel and threading wheel nuts onto the tip ends of the bolts. A nut runner is used to tighten the wheel nuts.

When each of the wheel nuts is firmly threaded onto the corresponding bolt by the nut runner, an axial force, which is a tensile force, is exerted on the bolt and the wheel nut. The fastening state of the wheel nut may be checked by measuring the axial force.

In the related art, a method using ultrasonic waves or a method using a strain gauge may be used to measure the axial force of the wheel nut. These methods measure the axial force by measuring a variation in the length of the bolt that is deformed by the force generated when the wheel nut is threaded onto the bolt.

However, the above described-methods in the related art have drawbacks of flattening the head of the bolt to mount an ultrasonic sensor and excessive required time. Furthermore, the length of the bolt has to be known before the wheel nut is threaded onto the bolt, and the axial force of the bolt onto which the wheel nut is already threaded cannot be measured because the axial force is calculated based on deformation measured by the ultrasonic sensor. That is, the methods in the related art can perform measurement on only hardware that is not completely tightened. Therefore, it is difficult to check a vehicle having a defect in tightening (due to a lack of the axial force of the wheel nut).

SUMMARY

The present disclosure has been made to solve the above-mentioned problems occurring in the prior art while advantages achieved by the prior art are maintained intact.

An aspect of the present disclosure provides an axial force measurement apparatus and method for reducing measurement time and cost and improving the accuracy of measurement.

Another aspect of the present disclosure provides an axial force measurement apparatus and method for rapidly and accurately determining an axial force of a bolt member using artificial intelligence.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, an apparatus for measuring an axial force of a bolt member by measuring a clamping force, of a nut member threaded onto the bolt member, which is applied to fasten a structure, includes: a sensor that applies vibration to the structure through one side of the tightened nut member and obtains, on an opposite side of the nut member, a signal by the vibration that propagates through the structure and passes through the nut member; and an analyzer that analyzes the signal received from the sensor and determines the axial force of the bolt member using a difference in propagation velocity of the signal by the vibration according to the clamping force of the nut member.

The apparatus may further include a sensing jig that locates the sensor in a close position to the nut member. The sensing jig may be fixed to the nut member and may be attached to a clamped surface of the structure with which the nut member makes contact.

The analyzer may analyze a signal that is being determined and which is measured by the sensor, based on learning data that is learned in advance by machine learning and may determine an axial force corresponding to the signal being determined, by interpolating data.

According to another exemplary embodiment of the present disclosure, a method for measuring an axial force of a bolt member by measuring a clamping force, of a nut member threaded onto the bolt member, which is applied to fasten a structure, includes: a first step of installing a sensor in the structure such that the sensor is adjacent to the nut member, by fixing a sensing jig, on which the sensor is mounted, to the nut member; a second step of applying, by the sensor, vibration to the structure through one side of the tightened nut member and obtaining, by the sensor on an opposite side of the nut member, a signal by the vibration that propagates through the structure and passes through the nut member; and a third step of analyzing the signal received from the sensor and determining the axial force of the bolt member using a difference in propagation velocity of the signal by the vibration according to the clamping force of the nut member.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
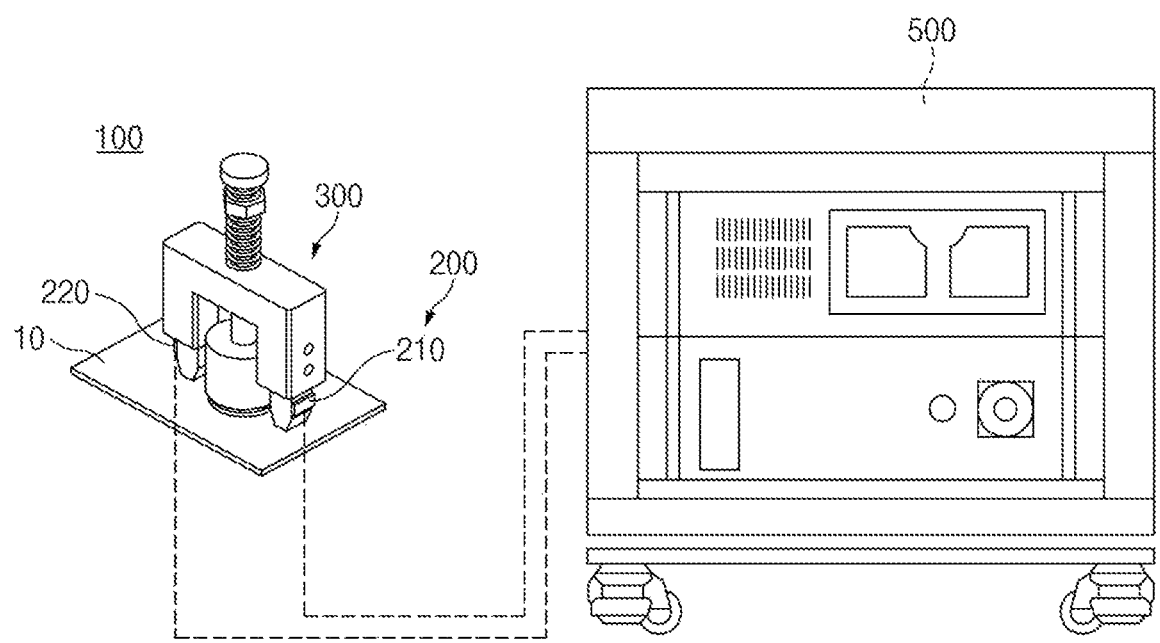
FIG. 1 is a view illustrating a configuration of an axial force measurement apparatus according to an exemplary embodiment of the present disclosure.

Hereinafter, exemplary embodiments of the present disclosure will be described in detail with reference to the accompanying drawings.

The following embodiments are embodiments appropriate for the understanding of technical features of an apparatus and method for measuring an axial force of a bolt member according to the present disclosure. However, the present disclosure is not limited to the following embodiments, and technical features of the present disclosure are not restricted by the following embodiments. Furthermore, various changes and modifications can be made without departing from the spirit and scope of the present disclosure.

An axial force measurement apparatus 100 according to an exemplary embodiment of the present disclosure is based on measuring an axial force of a bolt member (not illustrated) by measuring a clamping force that the bolt member and a nut member 20 threaded onto the bolt member apply to fasten a structure 10. For example, the structure 10 may be a wheel of a vehicle, and the nut member 20 may be a wheel nut that fastens the wheel. The bolt member may pass through the structure 10, and the nut member 20 may be threaded onto the bolt member. The bolt member may be fixed to a wheel disk of the vehicle, and the nut member 20 may be threaded onto the bolt member to fasten the wheel, which is the structure 10, to the wheel disk. Hereinafter, for convenience, the surface of the structure 10 that is pressed by the nut member 20 is referred to as the clamped surface 10, and the structure 10 and the clamped surface 10 are denoted by the same reference numeral.

However, without being limited to the wheel and wheel nut of the vehicle, the structure 10 and the nut member 20 to which the present disclosure is applied may be various structures 10 and bolt-nut structures for fastening the structures 10.

Referring to FIG. 1, the axial force measurement apparatus 100 according to an exemplary embodiment of the present disclosure includes a sensor 200 and an analyzer 500.

The sensor 200 applies vibration to the structure 10 through one side of the tightened nut member 20 and obtains, on an opposite side of the nut member 20, a signal by the vibration that propagates through the structure 10 and passes through the nut member 20.

Specifically, the sensor 200 may be connected to the structure 10 and may measure the clamping force of the nut member 20 using vibration characteristics of the structure 10 and the nut member 20. For example, the sensor 200 may include a first sensor 210 and a second sensor 220. The first sensor 210 may be located on the one side of the nut member 20 and may apply waves to the structure 10 by an element having a piezoelectric effect. The second sensor 220 may be provided on the opposite side of the nut member 20 and may measure the waves applied by the first sensor 210 and transmitted through the nut member 20. Here, the first sensor 210 may be a piezoelectric sensor using a piezoelectric element, and the second sensor 220 may be an acceleration sensor that measures the vibration of the structure 10 by processing an output signal. However, the sensor 200 is not limited thereto, and various types of sensors may be applied as long as the sensors are capable of exciting the structure 10 and measuring a signal propagated by the excitation.

The first sensor 210 and the second sensor 220 may be connected to the structure 10 by a sensing jig 300 that will be described below. However, the first sensor 210 and the second sensor 220 are not limited thereto, and various changes and modifications can be made as long as the first sensor 210 and the second sensor 220 are able to be connected to the structure 10 to apply vibration and detect a signal.

The first sensor 210 may generate waves through the one side of the nut member 20, and the second sensor 220 may measure, on the opposite side of the nut member 20, the waves transmitted. Here, the one side and the opposite side of the nut member 20 are opposite to each other with respect to the nut member 20. The second sensor 220 may measure the waves generated by the first sensor 210, by processing a signal transmitted through the nut member 20.

The analyzer 500 analyzes the signal received from the sensor 200 and determines the axial force of the bolt member using a difference in propagation velocity of the signal by the vibration according to the clamping force of the nut member 20.

Specifically, referring to FIG. 1, the analyzer 500 may be electrically connected with the sensor 200 and may analyze the signal transmitted from the sensor 200. Furthermore, the waves passing through the nut member 20 are transmitted under the influence of the clamping force of the nut member 20. That is, the propagation velocity of the waves reaching the second sensor 220 may vary depending on the degree to which the nut member 20 is tightened. The signal obtained through the second sensor 220 may be represented as amplitude values over time (refer to FIG. 10), and an initial signal that is a peak signal received first varies depending on the clamping force (refer to FIG. 11). That is, the initial signal may be more rapidly received with an increase in the clamping force. The analyzer 500 may measure the axial force using the characteristic.

Figure 9:
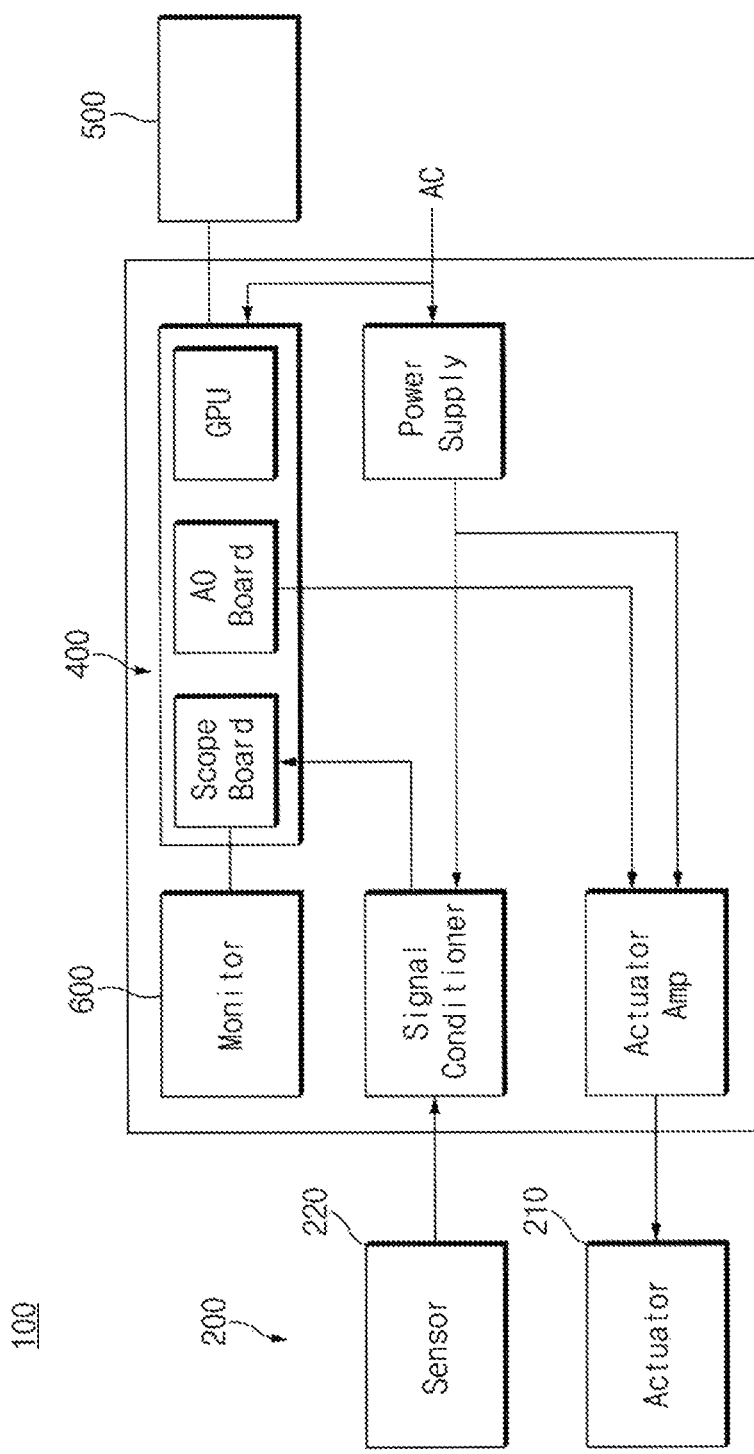
FIG. 9 is a schematic view illustrating a configuration of the axial force measurement apparatus according to an exemplary embodiment of the present disclosure.

The axial force measurement apparatus 100 of the present disclosure may further include a signal processor 400 (refer to FIG. 9). The signal processor 400 may generate and transmit a wave form to the first sensor 210 and may transfer a signal measured by the second sensor 220 to the analyzer 500.

For example, one example of the signal processor 400 is illustrated in FIG. 9. However, the signal processor 400 according to an exemplary embodiment of the present disclosure is not limited to the signal processor 400 illustrated in FIG. 9, and various changes and modifications can be made.

Referring to FIG. 9, the signal processor 400 according to an exemplary embodiment of the present disclosure may include a scope board and an AO board and may further include a signal conditioner and an actuator amp. The AO board may output a wave form desired by an operator with a voltage of a predetermined magnitude (±10 V). The actuator amp may amplify the voltage wave form generated by the AO board and may transmit a signal to the piezo-electric element of the first sensor 210. The signal conditioner may supply constant current to the acceleration sensor that is the second sensor 220. The signal conditioner may amplify an acceleration signal measured by the second sensor 220 and may transmit the amplified acceleration signal to the scope board. The scope board may measure the received signal at high speed (e.g., 200 MHz) and may transfer the signal data to the analyzer 500. A configuration of the signal processor 400 and configurations of the components thereof are not limited to those described above.

As described above, the axial force measurement apparatus 100 according to an exemplary embodiment of the present disclosure uses the vibration characteristic of the structure using the sensor 200, which is a smart component, when or after the nut member 20 is threaded onto the bolt member, thereby reducing measurement time and cost, compared with a technology (e.g., ultrasonic waves) that is used to measure the axial force in the related art. Furthermore, the axial force measurement apparatus 100 may improve the accuracy of measurement and may provide convenience of use to a user.

An axial force measurement method (e.g., ultrasonic waves) in the related art has a problem in that it is difficult to apply the method to a vehicle mass-production line of a conveyor type due to machining of separate hardware and an excessive amount of measurement time. However, the axial force measurement apparatus 100 according to the present disclosure does not require machining of separate hardware and rapidly performs measurement. Thus, the axial force measurement apparatus 100 is applicable to a mass-production line of a conveyor type.

In addition, when the axial force measurement apparatus 100 is used, it is unnecessary to know the strain of the bolt member. Accordingly, the axial force measurement apparatus 100 may measure the clamping force of the nut member 20 not only when the nut member 20 is threaded onto the bolt member but also after the nut member 20 is threaded onto the bolt member.

The axial force measurement apparatus 100 according to the present disclosure may further include the sensing jig 300. Hereinafter, the sensing jig 300 according to an exemplary embodiment of the present disclosure will be described with reference to FIGS. 2 to 7.

Figure 2:
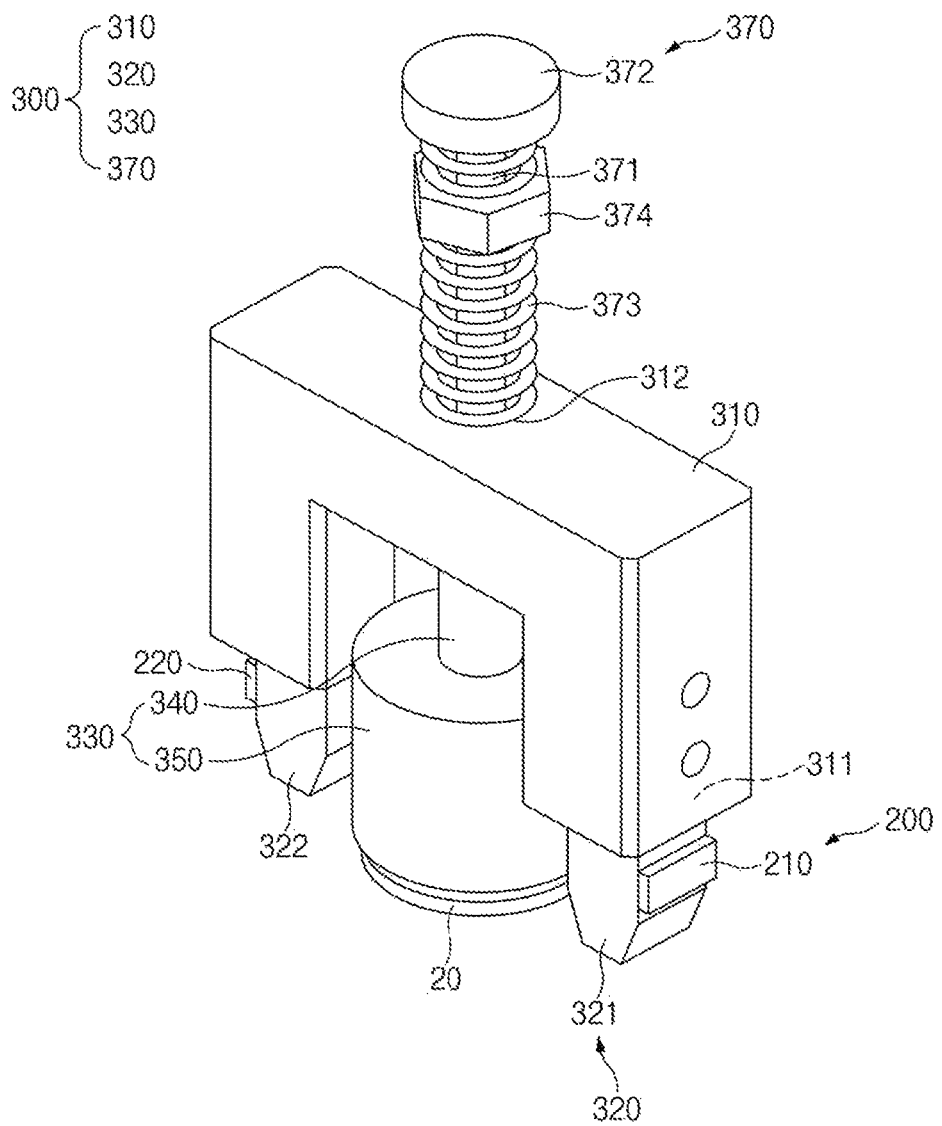
FIG. 2 is a perspective view illustrating a sensing jig and a sensor that are applied to an exemplary embodiment of the present disclosure.
Figure 3:
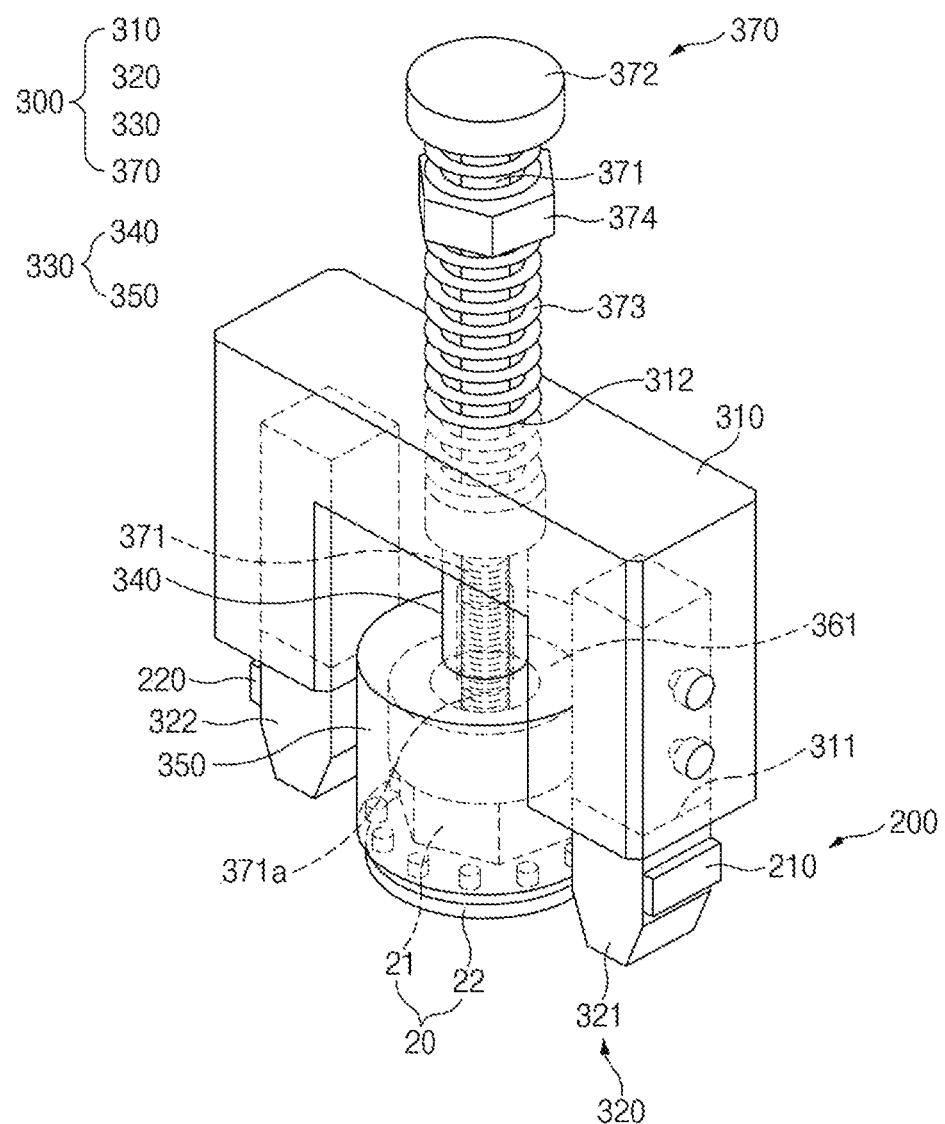
FIG. 3 is a view illustrating the interior of a body in FIG. 2.

Referring to FIGS. 2 and 3, the sensing jig 300 may locate the sensor 200 in a close position to the nut member 20. The sensing jig 300 may be attached to the clamped surface 10 of the structure 10 with which the nut member 20 makes contact, and may be fixed to the nut member 20. The sensor 200 may be installed in the structure 10 through the sensing jig 300 so as to be adjacent to the nut member 20 that is an object being measured.

Specifically, the sensing jig 300 may include a body 310, a pair of legs 320, a holder 330, and a pressing part 370.

The body 310 may have a through-hole 312 vertically formed through the center of the body 310 and a pair of mounting recesses 311 formed on opposite sides of the through-hole 312. Each of the mounting recesses 311 may be open at one side that faces the nut member 20.

The legs 320 may be combined with the body 310 and may be brought into contact with the clamped surface 10. The sensor 200 may be installed on the legs 320. The pair of legs 320 may be disposed on the opposite sides of the nut member 20, respectively.

Specifically, the pair of legs 320 may include a first leg 321 to which the first sensor 210 is attached and a second leg 322 to which the second sensor 220 is attached. The first leg 321 may be disposed on the one side of the nut member 20, and the second leg 322 may be disposed on the opposite side of the nut member 20. In the embodiment illustrated, the first sensor 210 and the second sensor 220 are attached to side surfaces of the legs 320. However, the attachment position of the sensor 200 is not limited thereto, and the sensor 200 may be installed in various positions as long as the vibration characteristic of the structure 10 is available. For example, recesses may be formed on lower surfaces of the legs 320 or the clamped surface 10, and the first sensor 210 and the second sensor 220 may be attached to lower side surfaces of the legs 320. Furthermore, the shapes of the legs 320 are not limited to the embodiment illustrated, and the legs 320 may be modified in various shapes. For example, the legs 320 may include a sharp tip end that is brought into contact with the clamped surface 10 (refer to FIG. 8).

As described above, the legs 320 are installed to be in contact with the clamped surface 10, and therefore, the first sensor 210 and the second sensor 220 installed on the legs 320 may be installed in the structure 10 to perform sensing.

The holder 330 may be combined with the body 310. The holder 330 may be provided between the pair of legs 320. The holder 330 may be fixed to the nut member 20.

Specifically, the holder 330 may include a first part 340 and a second part 350. In addition, the holder 330 may further include a first magnet 361 and second magnets 362.

Figure 4:
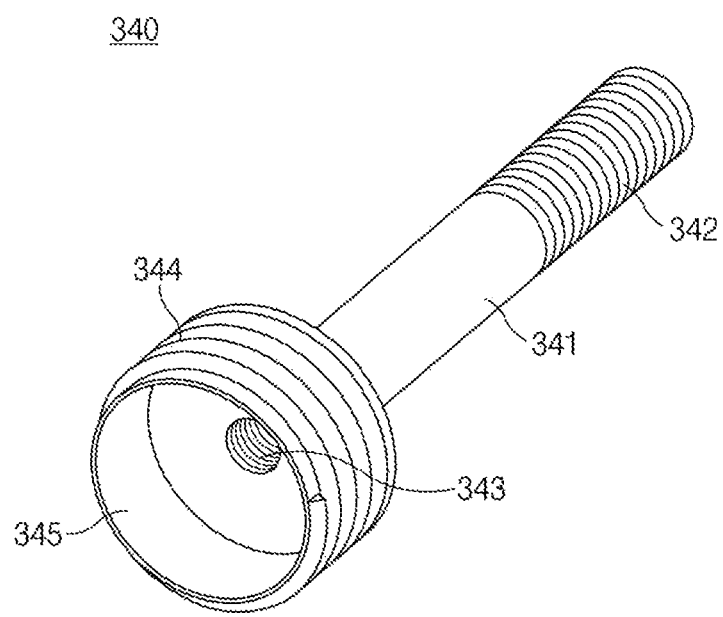
FIG. 4 is a perspective view illustrating a first part of a holder applied to an exemplary embodiment of the present disclosure.

Referring to FIG. 4, the first part 340 may be linearly movably inserted into the through-hole 312 formed through the body 310 and may be combined with the pressing part 370.

The first part 340 may include a first body 341, a connecting part 344 provided on an end portion of the first body 341 that faces the nut member 20 and connected with the second part 350, and a first magnet insertion recess 345 formed in the connecting part 344 so as to be open toward the nut member 20.

The first body 341 may have a rod shape extending in the lengthwise direction. The first body 341 may include a coupling hole 343. The coupling hole 343 may be formed through the center of the first body 341 in the lengthwise direction, and a second thread may be formed on at least part of the inner circumferential surface of the coupling hole 343. Furthermore, a first thread 342 may be formed on at least part of the outer circumferential surface of the first body 341.

The connecting part 344 may have a larger diameter than the first body 341, and the first magnet insertion recess 345 may connect to the coupling hole 343. The first magnet 361 may be inserted into and mounted in the first magnet insertion recess 345 and may be attached to at least an upper surface of the nut member 20 by a magnetic force. The first magnet 361 may have a hole formed therein such that the coupling hole 343 is connected with the upper surface of the nut member 20. By attaching the first magnet 361 to the nut member 20, the holder 330 may be fixed to the nut member 20, and thus the sensing jig 300 may be attached to the structure 10.

Figure 5:
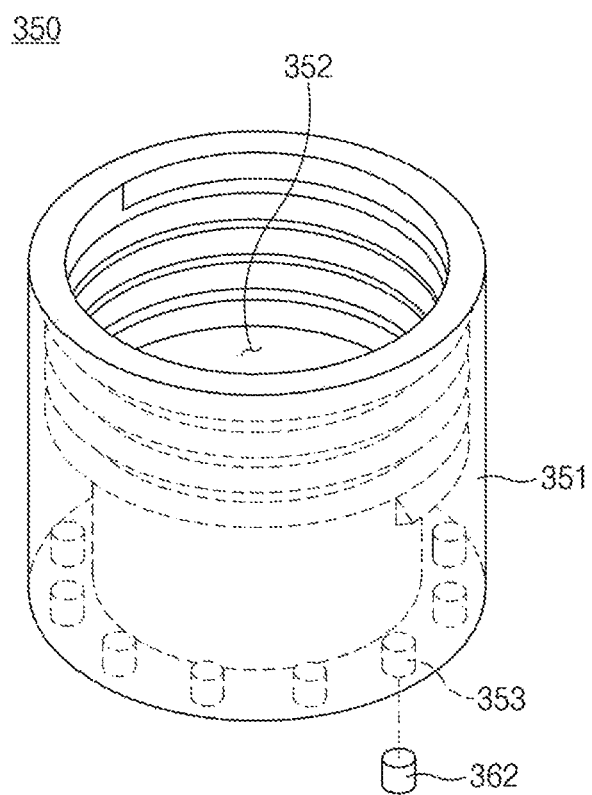
FIG. 5 is a perspective view illustrating a second part of the holder applied to an exemplary embodiment of the present disclosure.
Figure 6:
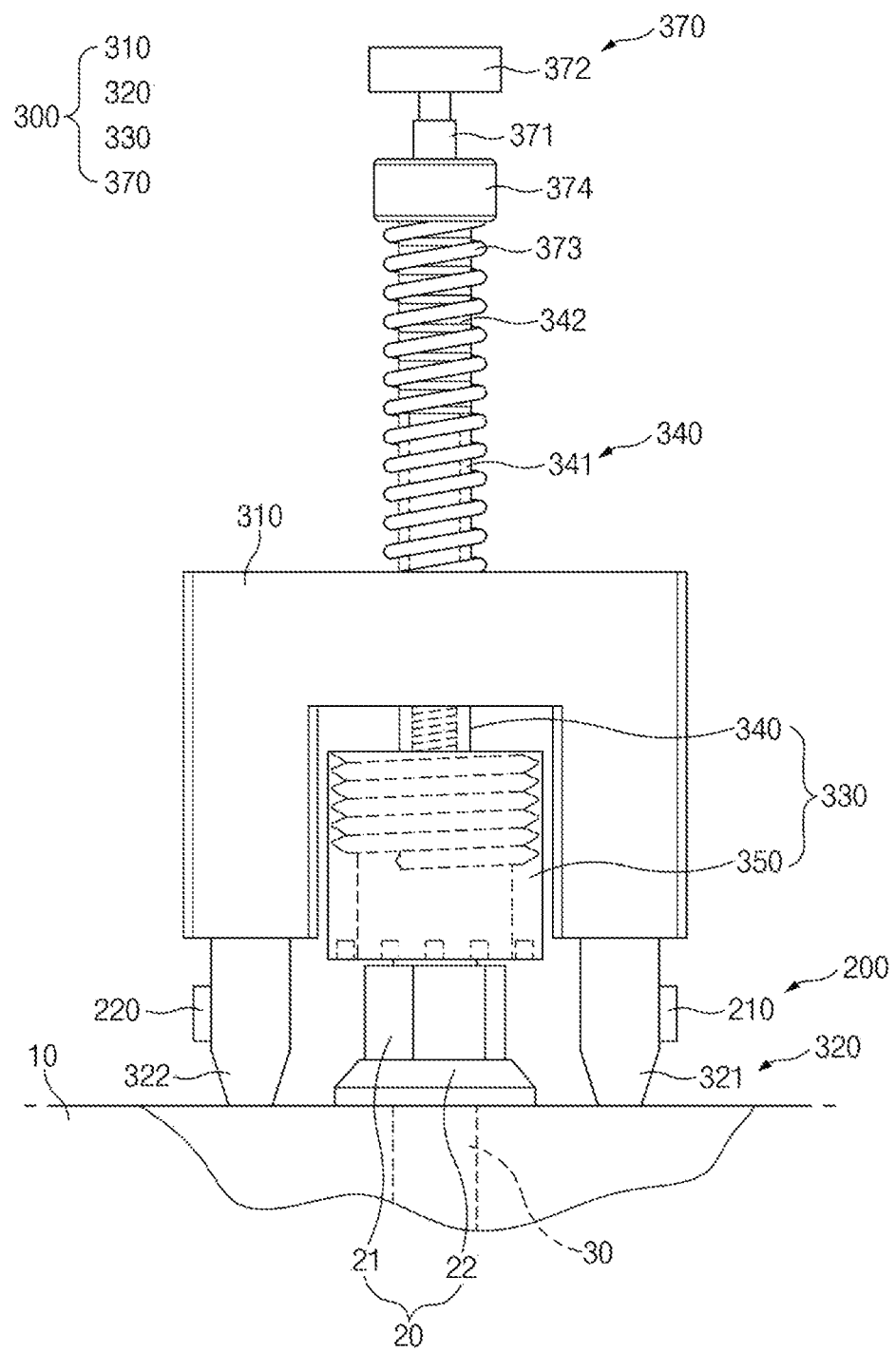
FIGS. 6 and 7 are views illustrating an operation of the sensing jig according to an exemplary embodiment of the present disclosure.

Referring to FIG. 5, the second part 350 may be combined with an end portion of the first part 340 that faces the nut member 20 and may have a hollow space 352 into which the nut member 20 is inserted.

The second part 350 may include a second body 351 and second magnet insertion recesses 353 formed on an end portion of the second body 351 that faces the clamped surface 10. Specifically, the second body 351 may have a cylindrical shape with the hollow space 352 inside. The second part 350 may have, on the inner circumferential surface thereof, a thread corresponding to a thread formed on the outer circumferential surface of the connecting part 344 of the first part 340, and the first part 340 may be screwed into the second part 350.

The nut member 20 may include a nut body 21 inserted into the hollow space 352 and a flange 22 protruding in the radial direction from an end portion of the nut body 21 that faces the clamped surface 10. The second magnets 362 may be fixedly mounted in the second magnet insertion recesses 353 and may be attached to the flange 22 of the nut member 20. Each of the second magnet insertion recesses 353 may be open at one side that faces the flange 22. The holder 330 may be more firmly attached to the nut member 20 by the second magnets 362.

As described above, the holder 330 according to an exemplary embodiment of the present disclosure may be firmly attached to the nut member 20 by the first magnet 361 and the second magnets 362.

The pressing part 370 may be combined with the holder 330. The pressing part 370 may press the holder 330 to cause the holder 330 to be attached to the nut member 20, and may press the body 310 to cause the legs 320 to be brought into close contact with the clamped surface 10.

Specifically, the pressing part 370 may include a pressing support rod 371 and a push button 372. In addition, the pressing part 370 may further include a compression spring 373 and an adjustment nut 374.

The pressing support rod 371 may be inserted into the coupling hole 343 and may have, on the outer circumferential surface thereof, a third thread that is threaded into the second thread. The push button 372 may be integrated with an end portion of the pressing support rod 371 that faces away from the nut member 20.

When the push button 372 is rotated with the holder 330 attached to the nut member 20, an end portion of the pressing support rod 371 may push the nut member 20 while moving toward the nut member 20 by the engagement of the second thread and the third thread, and therefore the holder 330 may be separated from the nut member 20.

Specifically, the pressing support rod 371 may have a rod shape and may be installed to pass through the coupling hole 343. A lower end portion of the pressing support rod 371 may protrude toward the nut member 20. The coupling hole 343 may have the second thread formed on a partial area including a lower end portion thereof, and the pressing support rod 371 may be combined with the holder 330 by the engagement of the second thread and the third thread. The operator may rotate the push button 372 to screw the pressing support rod 371 into the holder 330.

Figure 7:
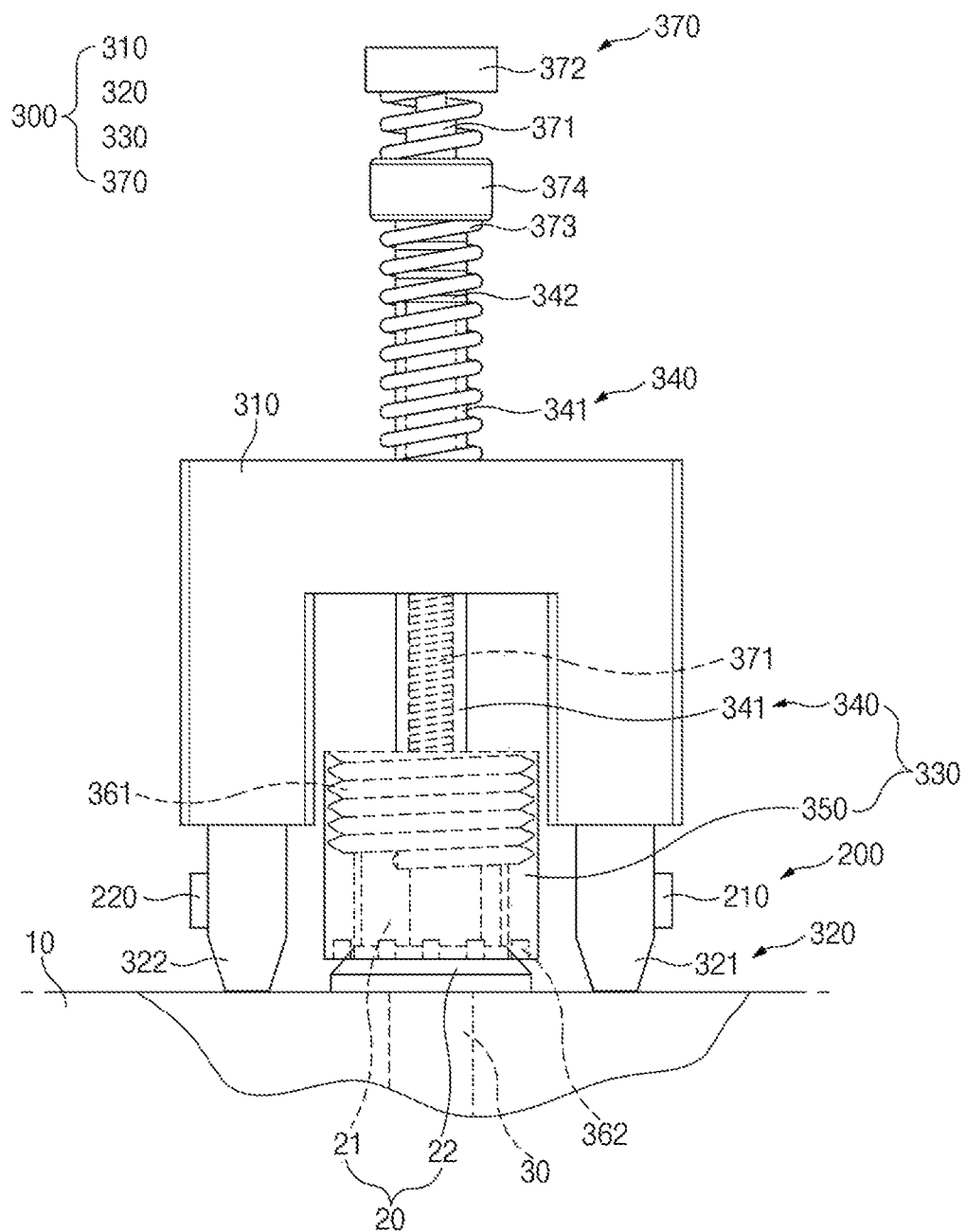

When an external force is applied to the push button 372 in the direction toward the nut member 20, the holder 330 may be moved toward the nut member 20 and may be attached to the nut member 20 by the magnetic force (refer to FIG. 7). In contrast, when a rotational force is applied to the push button 372 while the holder 330 is attached to the nut member 20, the pressing support rod 371 may move toward the nut member 20 while rotating by the engagement of the second thread and the third thread. A distal end 371a of the pressing support rod 371 may be brought into contact with the upper surface of the nut member 20 and may push the nut member 20 while protruding. Accordingly, the holder 330 may be separated from the nut member 20 (refer to FIG. 6).

The pressing part 370 may adjust the attachment force of the holder 330 and the force by which the legs 320 are brought into close contact with the clamped surface 10, by using the compression spring 373 and the adjustment nut 374.

Specifically, the compression spring 373 may be mounted on the outer circumferential surface of the first part 340, and one end portion of the compression spring 373 in the lengthwise direction may be supported by the body 310. The compression spring 373 may transmit a compressive force to the legs 320 in the direction toward the clamped surface 10. That is, the compression spring 373 may transmit, to the legs 320, a compressive force perpendicular to the clamped surface 10. The compressive force may be determined by the spring constant of the compression spring 373.

The adjustment nut 374 may be provided adjacent to an opposite end portion of the compression spring 373 in the lengthwise direction to adjust the tension of the compression spring 373. The adjustment nut 374 may be threaded onto the first thread 342 so as to be movable along the lengthwise direction of the first part 340. For example, the adjustment nut 374 may be rotated and moved toward the body 310 to increase the compressive force of the compression spring 373.

A constant load may be applied to the nut member 20 by the compression spring 373 and the adjustment nut 374 that are included in the pressing part 370, and thus the sensing jig 300 may be attached to a correct position on the clamped surface 10. Accordingly, the sensing jig 300 may be prevented from escaping from the clamped surface 10 by an external force in the process of measuring the axial force. In addition, there may be obtained an effect that the legs 320 press the clamped surface 10 of the structure 10 with the same load as that applied to the nut member 20 by the compression spring 373. Accordingly, the axial force measurement apparatus 100 according to an exemplary embodiment of the present disclosure may stably and accurately measure the clamping force of the nut member 20.

Figure 8:
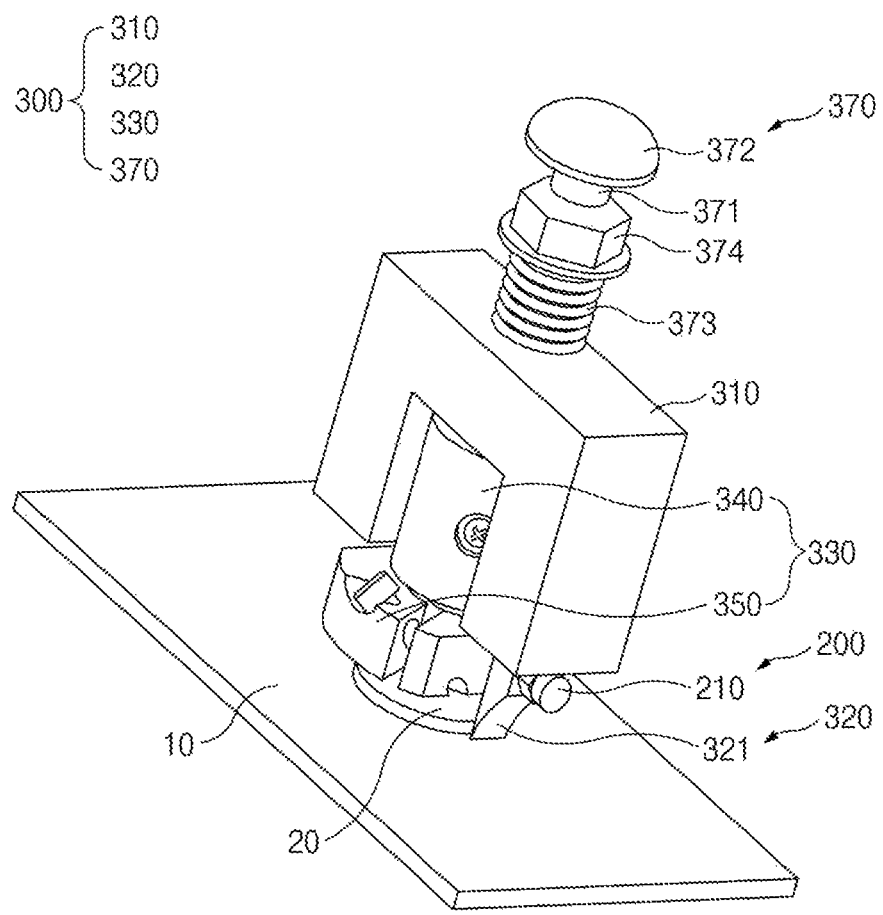
FIG. 8 is a perspective view illustrating another embodiment of the sensing jig applied to an exemplary embodiment of the present disclosure.

FIG. 8 illustrates a sensing jig 300 according to another exemplary embodiment of the present disclosure. The axial force measurement apparatus 100 according to the present disclosure may be applied to various forms of nut members 20 and structures 10, and various changes and modifications can be made depending on the types and shapes of the structures 10 and the nut members 20.

For example, as in the embodiment illustrated, a second part 350 may include a second body 351 and a clamp 355 that is combined with the second body 351 and that surrounds and fixes the outer circumferential surface of the nut member 20. Specifically, a holder 330 of the sensing jig 300 according to the other embodiment of the present disclosure may be combined with the nut member 20 by the clamp 355 rather than a magnetic force. However, it should be understood that the holder 330 according to the present disclosure may include both a magnet and the clamp 355.

Hereinafter, a process of determining, by the analyzer 500, the axial force of the bolt member will be described with reference to FIGS. 9 to 14.

The axial force measurement apparatus 100 according to an exemplary embodiment of the present disclosure may measure the axial force of the bolt member using artificial intelligence. For example, the axial force measurement apparatus 100 according to an exemplary embodiment of the present disclosure may measure the axial force of the bolt member by machine learning, and more specifically, may determine the axial force by deep learning.

Specifically, the analyzer 500 may analyze a signal that is being determined and which is measured by the sensor 200, based on learning data that is learned in advance by machine learning and may determine an axial force corresponding to the signal being determined, by interpolating data.

A learning model using the learning data, which is generated by a method to be described below, may be input to the analyzer 500, and the analyzer 500 may determine the axial force by analyzing the signal being determined, based on the learning model.

Hereinafter, a process of generating the learning model and the learning data by machine learning will be described. The process of generating the learning data, which is applied to the present disclosure, is illustrative and the present disclosure is not limited thereto. Although the following description is focused on deep learning, which is a kind of machine learning, machine learning applied to the present disclosure is not limited to the deep learning.

Figure 10:
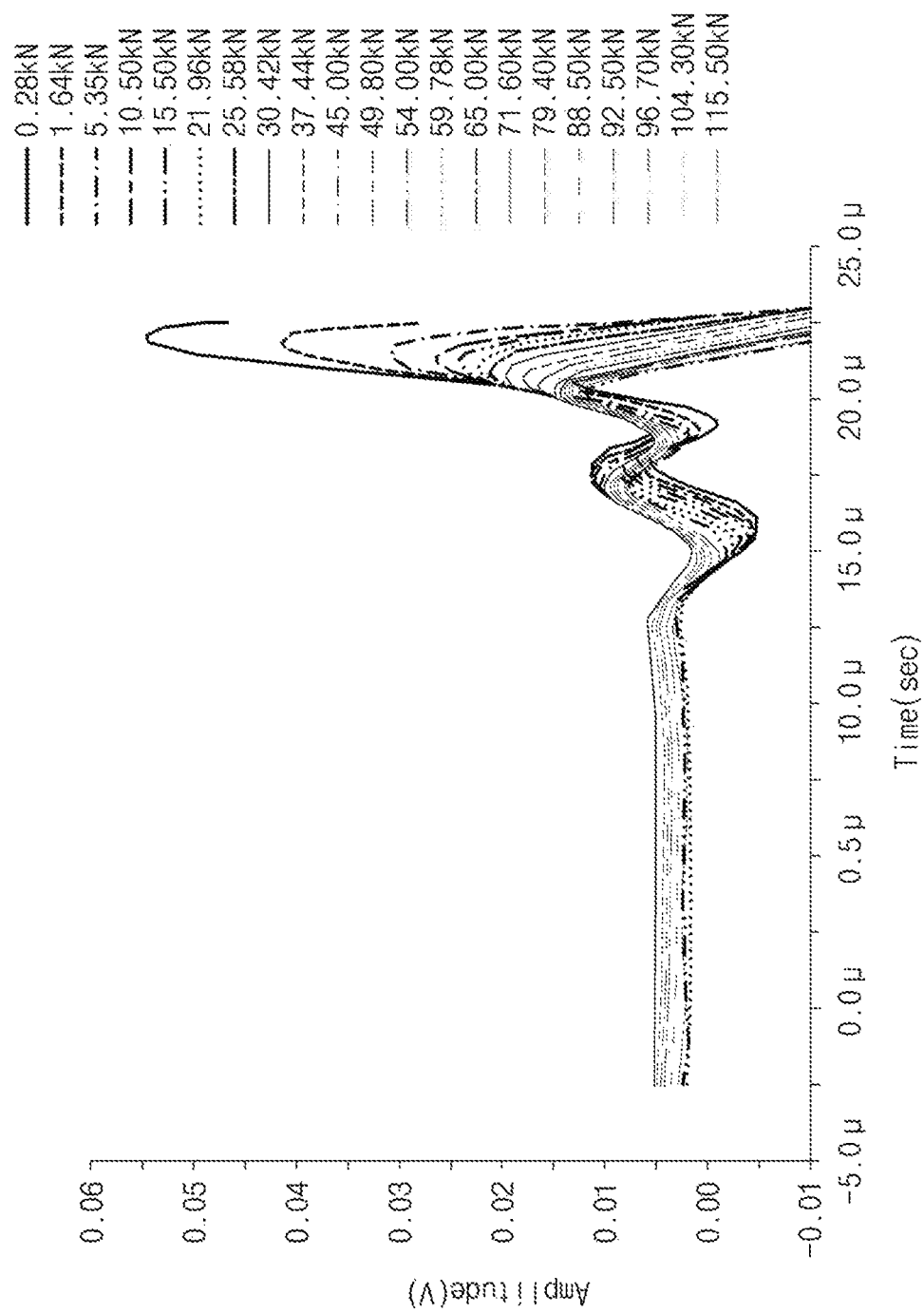
FIG. 10 is a graph depicting signals obtained by the sensor.

First, raw data for deep learning is acquired by using the sensor 200. That is, the sensor 200 according to the present disclosure may be used not only for measuring the axial force but also for generating the learning model. As described above, the propagation velocity of a signal reaching the second sensor 220 varies depending on the degree to which the nut member 20 is tightened. Therefore, clamping forces may be classified by using propagation velocity variations. Signals obtained by the second sensor 220 may be represented as amplitude values over time as illustrated in FIG. 10, and initial peak signals of the time-series data may be the raw data for the deep learning. Here, the number of wave form data corresponding to the signals received from the sensor 200 (the second sensor 220) may be reduced to the number of data required for the deep learning. The reduced wave form data may be brought into an image, and the reduced image data may be stored. Analysis time may be decreased by reducing the wave form data and brining the reduced wave form data into the image.

Figure 11:
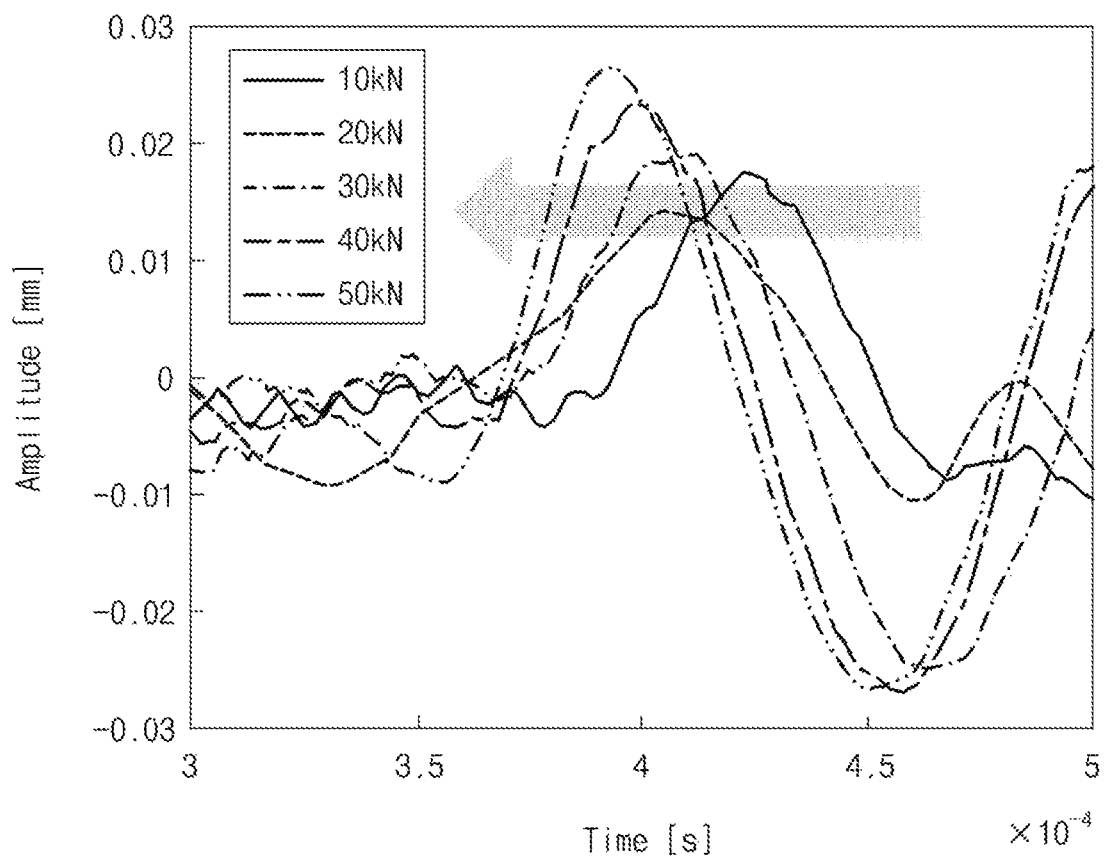
FIG. 11 is a graph depicting the signals obtained by the sensor according to clamping forces.
Figure 12:
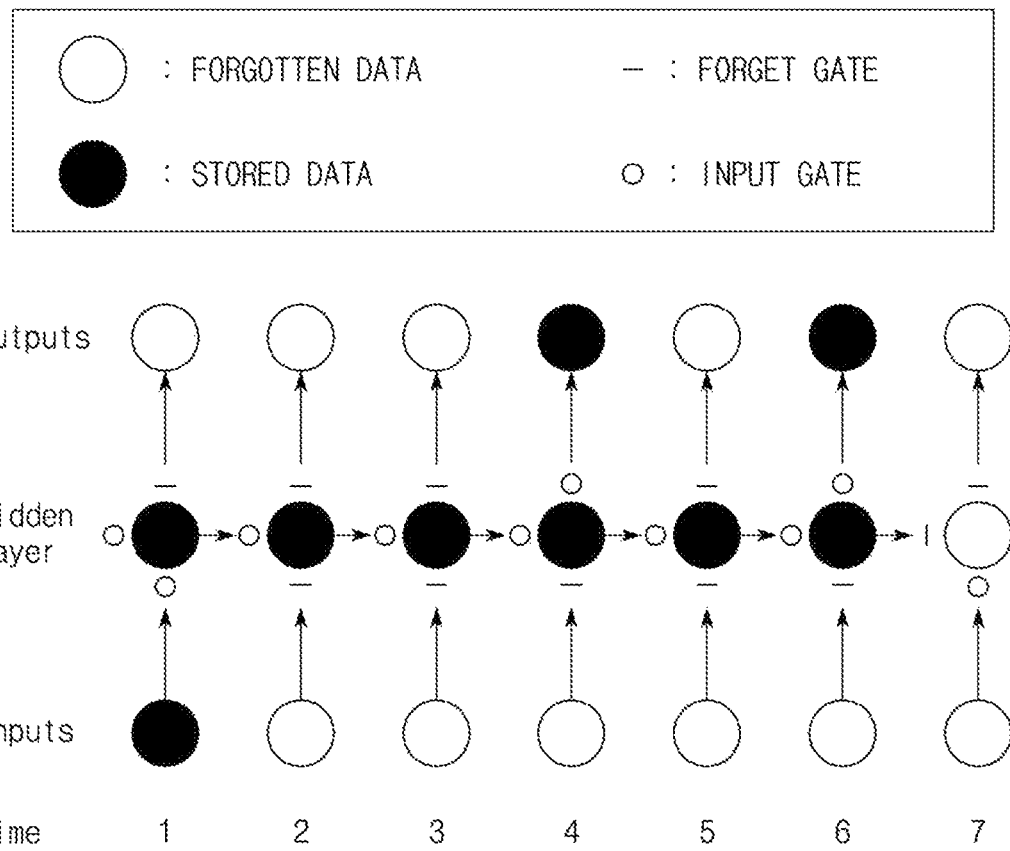
FIG. 12 is a view illustrating a basic operating principle of an LSTM algorithm.

FIG. 11 illustrates the signals according to clamping forces. An initial peak signal variation according to the clamping forces may be observed through the received signals. Through the initial peak signal variation, it can be seen that vibration is received at higher speed with an increase in the clamping force of the nut member 20. The clamping forces may be classified by using the time difference of receipt of the vibration.

Predicted data may be generated by using a recurrent neutral network (RNN) based on the raw data acquired. An RNN of a long-short term memory (LSTM) type may be used in the present disclosure. Specifically, based on the basic operating principle of an LSTM algorithm illustrated in FIG. 12, the input of time may be selectively stored from the signals according to vibration (refer to FIG. 11), which are the time-series data, by using an input gate and a forget gate. At this time, weights may be assigned to the input gate and the forget gate, respectively. The weights may be updated in a direction to determine how input data will change in the time-series data. The deep learning may proceed in this way.

Thereafter, signals may be generated by a method of predicting signals after the progress of the existing data, by using the pattern of data learned by the deep learning. For example, after learning is performed by using signal data according to predetermined clamping forces (e.g., 10 kN to 60 kN), signals according to unmeasured clamping forces (e.g., 70 kN to 80 kN) may be predicted and generated and may be used as data for a learning model.

Figure 13A:
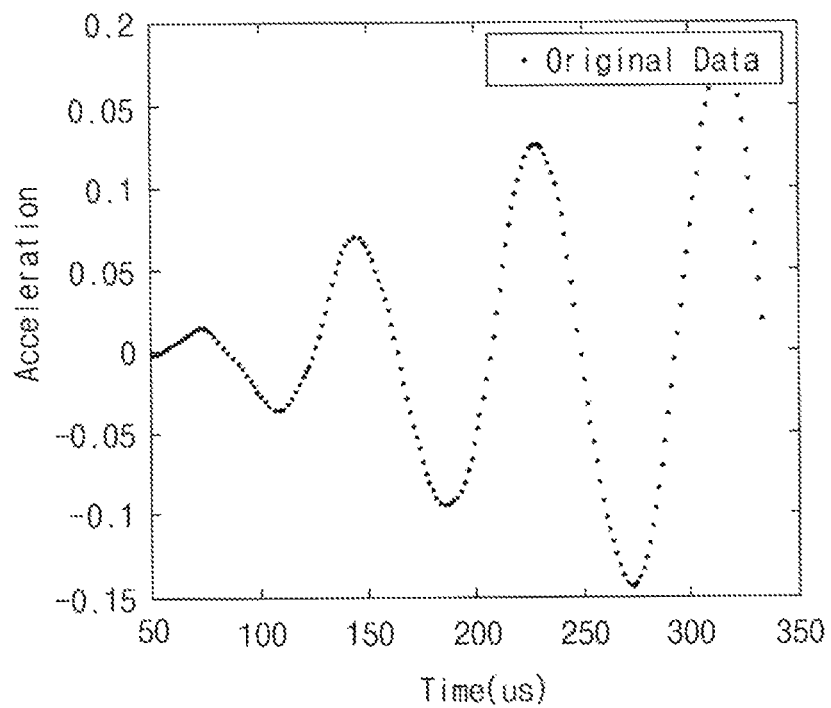
FIGS. 13A and 13B are views illustrating data generation and augmentation, respectively, by sampling.
Figure 13B:
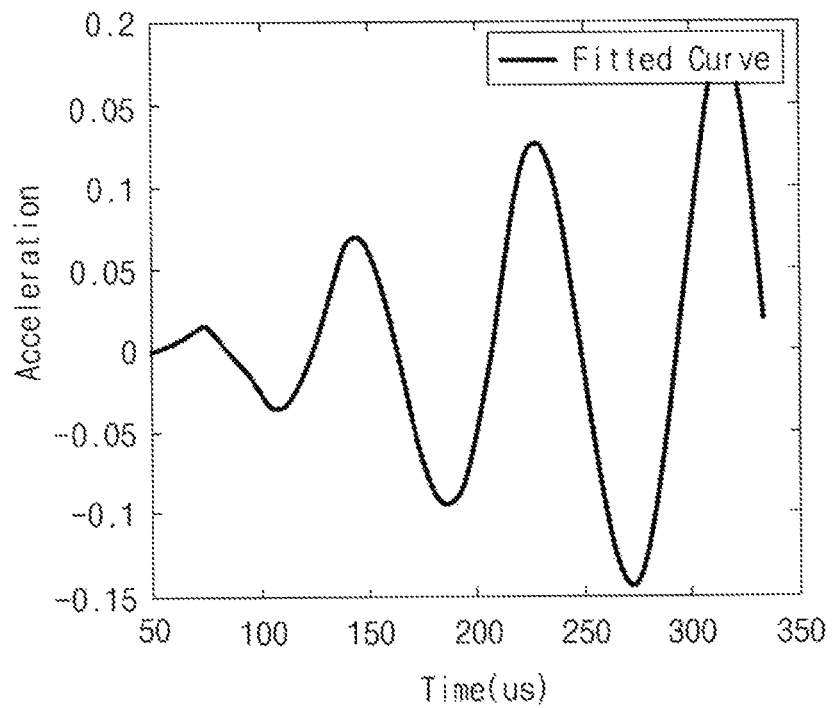

As illustrated in FIGS. 13A and 13B, data augmentation using sampling may be performed to ensure the number of data for the deep learning. That is, data may be augmented by generating data by sampling learned data wave forms. Specifically, data may be generated and augmented by a method of constructing a curve fitting discrete signals of original data and extracting new discrete signals from the fitted curve. In determining the axial force, the accuracy of determination may be improved by increasing the amount of learning data by ensuring a large amount of data in this way.

Figure 14:
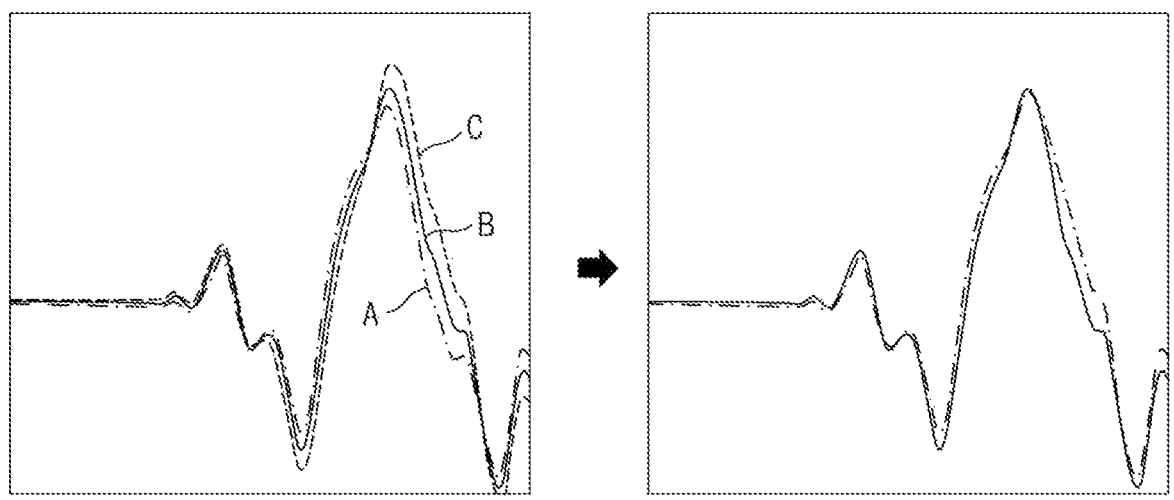
FIG. 14 is a graph illustrating a process of determining an axial force by an analyzer of an exemplary embodiment of the present disclosure.

The learning model may be generated by using the learning data generated by the above-described method. The learning model may be input to the analyzer 500. When measuring the axial force of the bolt member, the analyzer 500 may determine the axial force by analyzing a signal (a signal being determined) that is received from the sensor 200, based on the learning model. Referring to FIG. 14, the analyzer 500 may accurately determine the axial force by data interpolation after comparing and analyzing the learning data and the signal being determined. The data interpolation is a method of predicting unknown values by a linear combination of values around known data. In the left graph of FIG. 14, "A" denotes raw data, "B" denotes learning data, and "C" denotes data by a signal being determined. As in the right graph of FIG. 14, the analyzer 500 may compare and analyze the data and may determine an accurate axial force by interpolating the data.

The axial force measurement apparatus 100 according to an exemplary embodiment of the present disclosure may further include a display 600. The display 600 may display the axial force determined by the analyzer 500. The operator may monitor the axial force through the display 600. The operator may adjust the degree to which the nut member 20 is tightened, based on the axial force displayed on the display 600.

As described above, the axial force measurement apparatus 100 according to an exemplary embodiment of the present disclosure measures the axial force of the bolt member using the artificial intelligence, thereby rapidly and accurately determining the axial force.

Figure 15:
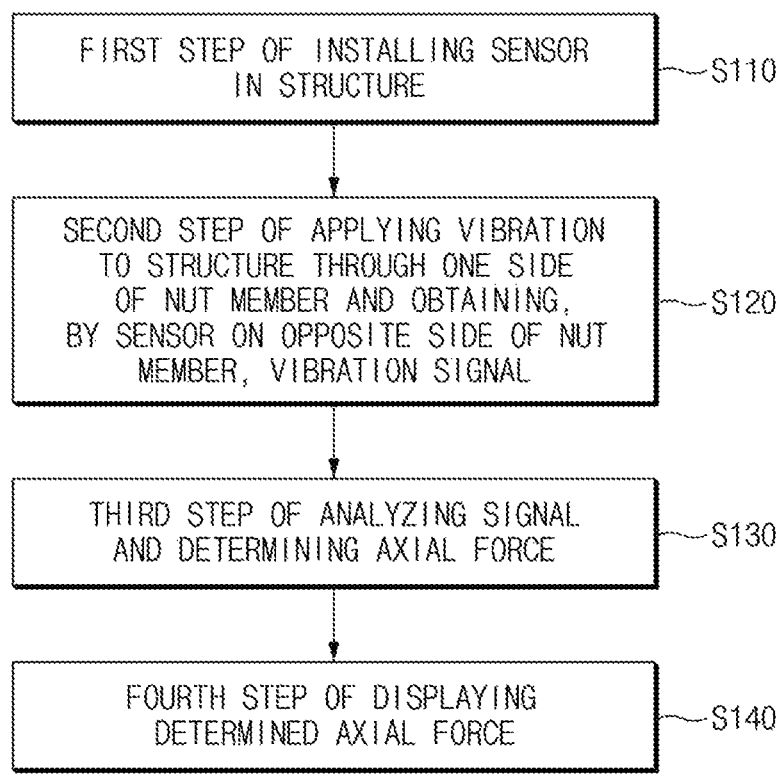
FIG. 15 is a flowchart illustrating a method for measuring an axial force of a bolt member according to an exemplary embodiment of the present disclosure.

Hereinafter, a method for measuring an axial force of a bolt member according to another exemplary embodiment of the present disclosure will be described with reference to FIG. 15. The axial force measurement method according to the present disclosure uses the above-described axial force measurement apparatus 100 (refer to FIGS. 1 to 14).

The axial force measurement method according to the present disclosure is based on measuring the axial force of the bolt member by measuring the clamping force that the bolt member and the nut member 20 threaded onto the bolt member apply to fasten the structure 10.

The axial force measurement method according to the present disclosure includes first step S110, second step S120, and third step S130. In addition, the axial force measurement method may further include fourth step S140.

First step S110 is a step of installing the sensor 200 in the structure 10 such that the sensor 200 is adjacent to the nut member 20, by fixing the sensing jig 300, on which the sensor 200 is mounted, to the nut member 20.

Second step S120 is a step of applying, by the sensor 200, vibration to the structure 10 through the one side of the tightened nut member 20 and obtaining, by the sensor 200 on the opposite side of the nut member 20, a signal by the vibration that propagates through the structure 10 and passes through the nut member 20.

Third step S130 is a step of analyzing the signal received from the sensor 200 and determining the axial force of the bolt member using a difference in propagation velocity of the signal by the vibration according to the clamping force of the nut member 20.

Fourth step S140 is a step of displaying the determined axial force after determining the axial force of the bolt member.

In third step S130, a signal that is being determined and which is measured by the sensor 200 may be analyzed based on learning data that is learned in advance by machine learning, and an axial force corresponding to the signal being determined may be determined by interpolating data.

As described above, the axial force measurement apparatus and method according to the present disclosure uses the vibration characteristic of the structure using the sensor, which is a smart component, when or after the nut member is threaded onto the bolt member, thereby reducing measurement time and cost, improving the accuracy of measurement, and providing user convenience.

Furthermore, the axial force measurement apparatus and method according to the present disclosure does not require machining of separate hardware and is capable of rapidly performing measurement. Thus, the axial force measurement apparatus and method is applicable to a mass-production line of a conveyor type.

In addition, the axial force measurement apparatus and method according to the present disclosure measures the axial force of the bolt member using the artificial intelligence, thereby rapidly and accurately determining the axial force of the bolt member.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for measuring an axial force of a bolt member by measuring a clamping force, of a nut member threaded onto the bolt member, which is applied to fasten a structure, the apparatus comprising:
a sensor configured to:
apply vibration to the structure through one side of the nut member, and
obtain, on an opposite side of the nut member, a signal by the vibration that propagates through the structure and passes through the nut member;
an analyzer configured to:
analyze the signal received from the sensor, and
determine the axial force of the bolt member using a difference in propagation velocity of the signal by the vibration according to the clamping force of the nut member; and
a sensing jig configured to locate the sensor adjacent the nut member, the sensing jig fixed to the nut member and attached to a clamped surface of the structure with which the nut member makes contact,
wherein the sensing jig includes:
a body;
a pair of legs combined with the body, the pair of legs disposed to be in contact with the clamped surface and disposed on the one side and the opposite side of the nut member, wherein the sensor is disposed on the pair of legs;
a holder combined with the body, the holder disposed between the pair of legs and fixed to the nut member; and
a pressing part combined with the holder, the pressing part configured to press the holder to cause the holder to be attached to the nut member and press the body to cause the pair of legs to be in contact with the clamped surface.

2. The apparatus of claim 1, wherein the sensor includes:
a first sensor disposed on the one side of the nut member, the first sensor configured to apply waves to the structure by an element having a piezoelectric effect; and
a second sensor disposed on the opposite side of the nut member, the second sensor configured to measure the waves applied by the first sensor and transmitted through the nut member.

3. The apparatus of claim 2, further comprising a signal processor configured to generate and transmit a wave form to the first sensor and transfer a signal measured by the second sensor to the analyzer.

4. The apparatus of claim 1, wherein the sensor includes:
a first sensor disposed on the one side of the nut member and configured to apply waves to the structure; and
a second sensor disposed on the opposite side of the nut member and configured to measure the waves transmitted, and
wherein the pair of legs include a first leg disposed on the one side of the nut member and a second leg disposed on the opposite side of the nut member, the first sensor and the second sensor are attached to the first leg and the second leg, respectively.

5. The apparatus of claim 1, wherein the holder includes:
a first part linearly movably inserted into a through-hole formed through the body, the first part is combined with the pressing part; and
a second part combined with an end portion of the first part that faces the nut member, the second part having a hollow space into which the nut member is inserted.

6. The apparatus of claim 5, wherein the first part includes:
a first body;
a connecting part disposed on an end portion of the first body that faces the nut member and connected with the second part; and
a first magnet insertion recess in the connecting part so as to be open toward the nut member, and
wherein the holder further includes a first magnet fixedly mounted in the first magnet insertion recess and attached to at least an upper surface of the nut member.

7. The apparatus of claim 5, wherein the nut member includes a nut body inserted into the hollow space and a flange protruding in a radial direction from an end portion of the nut body that faces the clamped surface,
wherein the second part includes a second body and a second magnet insertion recess formed on an end portion of the second body that faces the clamped surface, and wherein the holder further includes a second magnet fixedly mounted in the second magnet insertion recess and attached to the flange of the nut member.

8. The apparatus of claim 5, wherein the second part includes a second body and a clamp combined with the second body and configured to surround and fix an outer circumferential surface of the nut member.

9. The apparatus of claim 5, wherein the first part includes a first body and a coupling hole extending through a center of the first body in a lengthwise direction and having a second thread formed on at least part of an inner circumferential surface of the coupling hole,
wherein the pressing part includes:
a pressing support rod inserted into the coupling hole and having, on an outer circumferential surface thereof, a third thread that is threaded into the second thread; and
a push button integrated with an end portion of the pressing support rod that faces away from the nut member, and
wherein an end portion of the pressing support rod pushes the nut member while moving toward the nut member by engagement of the second thread and the third thread such that the holder is separated from the nut member, when the push button is rotated with the holder attached to the nut member.

10. The apparatus of claim 5, wherein the first part includes a first body and a first thread formed on at least part of an outer circumferential surface of the first body, and
wherein the pressing part includes:
a compression spring mounted on the outer circumferential surface of the first part and configured to transmit a compressive force to the pair of legs in a direction toward the clamped surface, wherein one end portion of the compression spring in a lengthwise direction is supported by the body; and
an adjustment nut disposed adjacent to an opposite end portion of the compression spring in the lengthwise direction to adjust tension of the compression spring, the adjustment nut is threaded onto the first thread so as to be movable along a lengthwise direction of the first part.

11. The apparatus of claim 1, wherein the analyzer analyzes the signal that is being determined and which is measured by the sensor, based on learning data that is obtained in advance by machine learning and determines an axial force corresponding to the signal being determined, by interpolating data.

12. The apparatus of claim 11, wherein raw data is acquired by obtaining the signal from the vibration according to the clamping force using the sensor,
wherein learning data and a learning model are generated by using a recurrent neutral network (RNN), based on the raw data, and wherein the analyzer determines the axial force by comparing the signal being determined and the learning model when measuring the axial force of the bolt member.

13. The apparatus of claim 1, further comprising:
a display configured to display the axial force determined by the analyzer.

14. A method for measuring an axial force of a bolt member by measuring a clamping force, of a nut member threaded onto the bolt member, which is applied to fasten a structure, the method comprising:
a first step of installing a sensor in the structure such that the sensor is adjacent to the nut member, by fixing a sensing jig, on which the sensor is mounted, to the nut member;
a second step of applying, by the sensor, vibration to the structure through one side of the tightened nut member and obtaining, by the sensor on an opposite side of the nut member, a signal by the vibration that propagates through the structure and passes through the nut member; and
a third step of analyzing the signal received from the sensor and determining the axial force of the bolt member using a difference in propagation velocity of the signal by the vibration according to the clamping force of the nut member, and
wherein the sensing jig includes:
a body;
a pair of legs combined with the body, the pair of legs disposed to be in contact with a clamped surface and disposed on the one side and the opposite side of the nut member, wherein the sensor is disposed on the pair of legs;
a holder combined with the body, the holder disposed between the pair of legs and fixed to the nut member; and
a pressing part combined with the holder, the pressing part configured to press the holder to cause the holder to be attached to the nut member and press the body to cause the pair of legs to be in contact with the clamped surface.

15. The method of claim 14, further comprising a fourth step of displaying the determined axial force after determining the axial force of the bolt member.

16. The method of claim 14, wherein in the third step, a signal that is being determined and which is measured by the sensor is analyzed based on learning data that is obtained in advance by machine learning, and an axial force corresponding to the signal being determined is determined by interpolating data.

* * * * *